(12) United States Patent
Wingett et al.

(10) Patent No.: US 7,240,583 B2
(45) Date of Patent: Jul. 10, 2007

(54) DUAL FUNCTION, HIGHLY DAMPED, STRUCTURALLY AND THERMALLY COMPLIANT AUXILIARY BEARING ASSEMBLY

(75) Inventors: Paul T. Wingett, Mesa, AZ (US); Todd R. Giles, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 693 days.

(21) Appl. No.: 10/696,216

(22) Filed: Oct. 28, 2003

(65) Prior Publication Data

US 2005/0089256 A1 Apr. 28, 2005

(51) Int. Cl.
*H02K 7/02* (2006.01)
*H02K 7/09* (2006.01)
*F16C 15/00* (2006.01)
*F16F 15/16* (2006.01)

(52) U.S. Cl. .............. 74/573.13; 74/572.1; 74/572.2; 310/90.5; 310/90; 318/150

(58) Field of Classification Search .............. 74/572.1, 74/572.2, 573.13, 574.1; 310/90.5, 90; 318/150; 384/489, 102
See application file for complete search history.

(56) References Cited

U.S. PATENT DOCUMENTS

| 2,244,197 | A |   | 6/1941  | Hessler            |          |
|-----------|---|---|---------|--------------------|----------|
| 4,329,000 | A |   | 5/1982  | Keske              |          |
| 4,601,591 | A |   | 7/1986  | Wright             |          |
| 5,021,697 | A | * | 6/1991  | Kralick            | 310/90.5 |
| 5,231,323 | A |   | 7/1993  | New                |          |
| 5,295,744 | A |   | 3/1994  | Petrzelka et al.   |          |
| 5,347,801 | A |   | 9/1994  | McIlwain           |          |
| 5,747,907 | A | * | 5/1998  | Miller             | 310/90   |
| 5,816,712 | A |   | 10/1998 | Brown et al.       |          |
| 5,941,133 | A |   | 8/1999  | Wierzba et al.     |          |
| 6,262,505 | B1| * | 7/2001  | Hockney et al.     | 310/90.5 |
| 6,483,216 | B2|   | 11/2002 | Bouille et al.     |          |
| 6,536,953 | B1|   | 3/2003  | Cope et al.        |          |
| 6,710,489 | B1| * | 3/2004  | Gabrys             | 310/90.5 |
| 6,921,998 | B2| * | 7/2005  | Giles et al.       | 310/90.5 |
| 2002/0081047 | A1 |  | 6/2002 | Zoppitelli et al. |          |
| 2003/0099417 | A1 |  | 5/2003 | Bauer et al.       |          |
| 2005/0040776 | A1 | * | 2/2005 | Sibley            | 318/150  |

* cited by examiner

*Primary Examiner*—Vinh T. Luong
(74) *Attorney, Agent, or Firm*—Ingrassia Fisher & Lorenz

(57) ABSTRACT

An auxiliary bearing assembly for selectively engaging a shaft, preferably in an energy storage flywheel system, is configured to include a vibration damping seal, and an axial preload spring. The vibration damping seal damps out vibrations from the rotating group, following engagement of the auxiliary bearing assembly, while the rotating group is spinning down. The axial preload spring absorbs any differential thermal expansion or contraction that may occur between components.

6 Claims, 2 Drawing Sheets

DUAL FUNCTION, HIGHLY DAMPED, STRUCTURALLY AND THERMALLY COMPLIANT AUXILIARY BEARING ASSEMBLY

FIELD OF THE INVENTION

The present invention relates to energy storage flywheel systems and, more particularly, to an auxiliary bearing assembly for an energy storage flywheel system.

BACKGROUND OF THE INVENTION

Many satellites and other spacecraft, as well as some terrestrial stationary and vehicle applications, such as sea-going vessels, can include one or more energy storage flywheel systems to provide both a backup power source and to provide attitude control for the vehicle. In such systems, each flywheel system is controlled and regulated to balance the electrical demand in the vehicle electrical distribution system, and may also be controlled in response to programmed or remote attitude (or torque) commands received by a main controller in the vehicle.

Many energy storage flywheel systems include one or more components that are rotationally supported within a housing assembly. These components, which may be referred to as the rotating group, include, for example, an energy storage flywheel, a motor/generator, and a shaft. In particular, the energy storage flywheel and motor/generator may be mounted on the shaft, which may in turn be rotationally supported in the housing assembly via one or more bearing assemblies. In many instances, the shaft is rotationally supported using one or more primary bearing assemblies, and one or more auxiliary, or back-up, bearing assemblies. For example, in many satellite and spacecraft applications, the flywheel system may include one or more magnetic bearing assemblies that function as the primary bearing assemblies, and one or more mechanical bearing assemblies that function as the auxiliary bearing assemblies. Typically, the primary bearing assemblies are used to rotationally support the rotating group, while the auxiliary bearing assemblies are otherwise disengaged from the rotating group. If one or more of the primary bearing assemblies is deactivated due, for example, to a malfunction, or otherwise becomes inoperable to rotationally support the rotating group, the auxiliary bearing assemblies will then engage, and thereby rotationally support, the rotating group.

When the auxiliary bearing assemblies engage the rotating group, the rotating group is, in many instances, rotating at relatively high speeds. During spin down of the rotating group, the auxiliary bearing assemblies may be subject to vibration as the rotating group rotates through certain speeds. Many of the auxiliary bearing assemblies presently used may not be configured to handle or dampen some of these vibrations. Thus the bearing assemblies, or other system components, may be damaged or worn. This can shorten system lifetime and increase overall system costs. Moreover, many of the auxiliary bearing assemblies may be constructed of materials having different thermal coefficients of expansion than the rotating group, as may many of the components that make up the rotating group. Thus, tolerances between the bearing assemblies and the rotating group can change with temperature. This can also lead to increased wear rate and/or damage, which can additionally lead to shortened system lifetime and increase overall system costs Hence, there is a need for an auxiliary bearing assembly that improves on one or more of the above-noted drawbacks. Namely, an auxiliary bearing assembly that is configured to absorb and/or damp out vibrations from the rotating components following engagement thereby of the auxiliary bearing assembly, and/or that can absorb differential thermal growths between rotating and stationary components. The present invention addresses one or more of these needs.

SUMMARY OF THE INVENTION

The present invention provides an auxiliary bearing assembly that is configured to absorb and/or damp out vibrations from rotating components that may be experienced following engagement of the auxiliary bearing assembly, while the rotating components are spinning down. The auxiliary bearing assembly is additionally configured to absorb differential thermal growths between rotating and stationary components within a device or system.

In one embodiment, and by way of example only, an energy storage flywheel system includes a housing assembly, a shaft, a flywheel assembly, one or more primary bearing assemblies, and one or more auxiliary bearing assemblies. The shaft is disposed within the housing assembly, and the flywheel assembly is mounted on the shaft. Each of the primary bearing assemblies are disposed within the housing assembly, and are configured to selectively rotationally support the shaft. Each of the auxiliary bearing assemblies is disposed within the housing assembly, and is configured to selectively rotationally support the shaft. Each auxiliary bearing assembly includes a bearing, a bearing mount, a sleeve, one or more resilient seals, and one or more preload springs. The bearing has at least an inner race and an outer race. The bearing mount is coupled to the bearing inner race, and is disposed adjacent to, and configured to selectively engage and disengage, the shaft. The sleeve has at least an inner surface, an outer surface, a first end, and a second end. At least a portion of the sleeve inner surface is coupled to the bearing assembly outer race and at least a portion of the sleeve outer surface coupled to the housing assembly. Each of the resilient seals is coupled between the sleeve outer surface and the housing assembly, and each preload spring is coupled between the housing assembly and one of the first and second sleeve ends.

In another exemplary embodiment, a bearing assembly for selectively engaging a shaft includes a bearing, a bearing mount, a sleeve, one or more resilient seals, and one or more preload springs. The bearing has at least an inner race and an outer race. The bearing mount is coupled to the bearing inner race. The sleeve has at least an inner surface, an outer surface, a first end, and a second end. At least a portion of the sleeve inner surface is coupled to the bearing assembly outer race. Each of the resilient seals is coupled to the sleeve outer surface, and each preload spring is coupled to one of the first and second sleeve ends.

Other independent features and advantages of the preferred auxiliary bearing assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in an energy storage flywheel system, it will be appreciated that it can be implemented in other systems and environments, both terrestrial and extraterrestrial.

Figure 1:
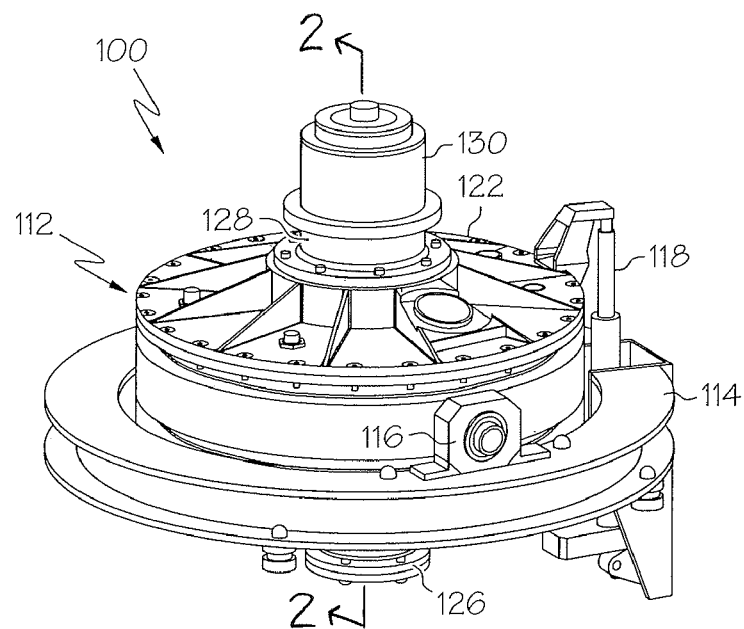
FIG. 1 is a perspective view of a physical embodiment of an exemplary energy storage flywheel system.
Figure 2:
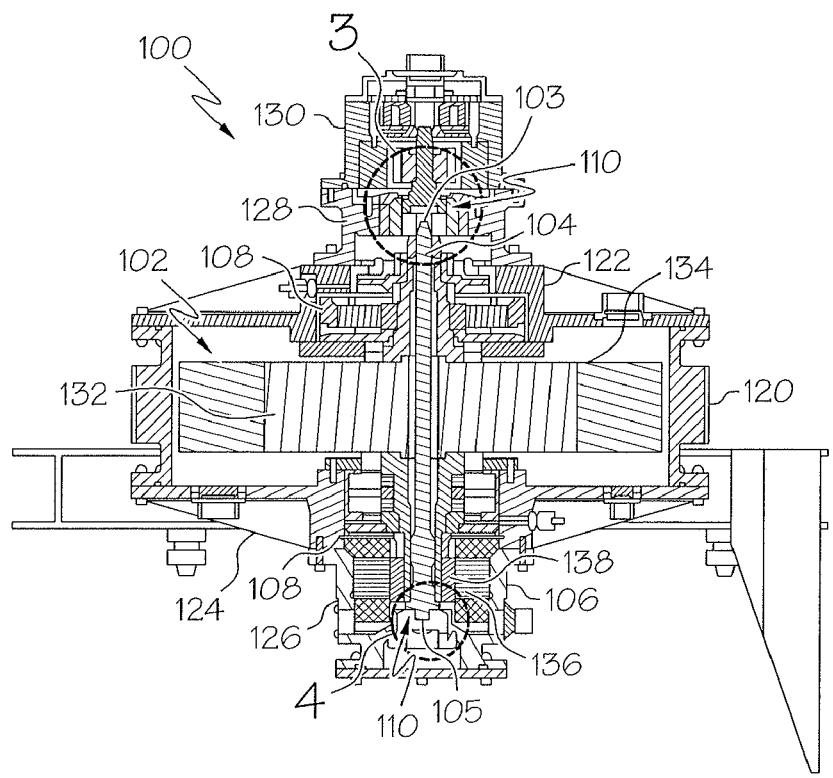
FIG. 2 is a cross section view of the energy storage flywheel system of FIG. 1 taken along line 2—2.

Turning now to the description and with reference to FIGS. 1 and 2, an exemplary physical embodiment of an energy storage flywheel system 100 is shown. The depicted energy storage flywheel system 100 includes a flywheel assembly 102, a shaft assembly 104, a motor/generator 106, a plurality of primary bearing assemblies 108, and a plurality of auxiliary bearing assemblies 110, all of which are mounted within a housing assembly 112. It will be appreciated that the internal portion of the housing assembly 112, during operation of the system 100, may be placed at a vacuum to minimize aerodynamic losses. It will additionally be appreciated that if the energy storage flywheel system 100 is installed in a natural vacuum environment, such as in space applications, then the housing assembly 112 need not be at a vacuum.

As shown most clearly in FIG. 1, the housing assembly 112, when used, for example, as part of a satellite power and attitude control system, is preferably rotationally mounted in a gimbal frame 114 via two gimbal bearings 116 (only one shown). A single gimbal actuator 118 is mounted on the gimbal frame 114 and is adapted to receive control signals from a gimbal controller (not shown). In response to these control signals, the gimbal actuator 118 positions the housing assembly 112 at appropriate angular velocities, to thereby effectuate attitude control. The gimbal actuator 118 may be any one of numerous types of actuators such as, for example, a linear actuator, as shown in FIG. 1, or a rotary actuator.

In the depicted embodiment, the housing assembly 112 includes a central section 120, two end sections 122 and 124, a motor/generator housing 126, an auxiliary bearing housing 128, and an auxiliary motor housing 130. Although the housing assembly 112 is depicted as being constructed of numerous sections that are coupled together, it will be appreciated that it could be formed as an integral structure. In any event, the motor/generator housing 126 is coupled to the housing assembly second end section 124, the auxiliary bearing housing 128 is coupled to the housing assembly first end section 122, and the auxiliary motor housing 130 is coupled to the auxiliary bearing housing 128.

The components mounted within the housing assembly 112 will now be described, beginning first with the flywheel assembly 102. The flywheel assembly 102 may be constructed in any one of numerous configurations and of any one of numerous materials. In the depicted embodiment, the flywheel 102 includes a hub 132 and a flywheel rim 134. The hub 132 is mounted on the shaft assembly 104. The hub 132 may be constructed in any one of numerous configurations including, for example, a solid configuration, a spoke-type configuration, or a combination thereof, and may be constructed of any one of numerous known suitable materials. The flywheel rim 134 is mounted on, and surrounds, the hub 132, and is preferably constructed of a material having a high strength-to-density ratio such as, for example, filament wound carbon fiber.

The shaft assembly 104, as was alluded to above, is coupled to the flywheel assembly hub 132, and is additionally coupled to portions of the motor/generator 106. The shaft assembly 104 is rotationally supported in the housing assembly 112, both radially and axially, by either the primary bearing assemblies 108 or the auxiliary bearing assemblies 110. The shaft assembly 104 includes two end sections, a first end section 103 and a second end section 105. The shaft assembly first 103 and second 105 end sections are at least partially surrounded by one of the secondary bearing assemblies 110. As will be described more fully below, the shaft assembly first 103 and second 105 end sections do not contact the auxiliary bearing assemblies 110, unless the primary bearing assemblies 108 are unable to rotationally supporting the shaft assembly 104.

The motor/generator 106, as was noted above, is at least partially coupled to the shaft assembly 104. In particular, the motor/generator 106 includes a stator assembly 136, which is coupled to the motor/generator housing 126, and a rotor assembly 138, which is coupled to the shaft assembly 104. The motor/generator 106, as is generally known, is configured to operate in either a motor mode or a generate mode. When operating in the motor mode, electrical energy is supplied to the motor/generator stator assembly 136 and, via normal motor action, the supplied electrical energy is converted to mechanical energy in the motor/generator rotor assembly 138, which in turn rotates the shaft assembly 104 and thus the flywheel assembly 102. Conversely, when it is operating in the generate mode, mechanical energy stored in the flywheel assembly 102 is supplied to the shaft assembly 104, which is in turn supplied to the motor/generator rotor assembly 138. This mechanical energy is converted to electrical energy in the motor/generator stator assembly 136, via normal generator action, and is supplied external to the energy storage flywheel system 100. It is to be appreciated that the motor/generator stator 136 and rotor 138 assemblies may be any one of numerous stator and rotor assembly designs known in the art for performing their intended functions. An understanding of the structure of the motor/generator stator 136 and rotor 138 assemblies is not necessary to an understanding of the present invention and, therefore, will not be further described.

In the depicted embodiment, the primary bearing assemblies 108 are magnetic bearing assemblies and the auxiliary bearing assemblies 110 are mechanical bearing assemblies 110. Thus, when the primary bearing assemblies 108 are activated and operating properly, the shaft assembly 104 is rotationally supported by the primary bearing assemblies 108. In this configuration, as was noted above, the shaft assembly first 103 and second 105 ends do not contact the auxiliary bearing assemblies 110. Conversely, when the primary bearing assemblies 108 are deactivated, or otherwise inoperable, the shaft assembly first 103 and second 105 ends do contact the auxiliary bearing assemblies 110, and the shaft assembly 104 is thus rotationally supported by the auxiliary bearing assemblies 110.

It was previously noted that the primary bearing assemblies 108 are preferably magnetic bearing assemblies and that the auxiliary bearing assemblies 110 are preferably mechanical bearing assemblies. More particularly, in the depicted embodiment, the primary magnetic bearing assemblies 108 are active magnetic bearing assemblies, and the auxiliary bearing assemblies 110 are mechanical, ball bearing type assemblies, and one each are positioned on either side of the flywheel assembly 102. In particular, with respect to the view depicted in FIG. 2, one primary bearing assembly 108 and one auxiliary bearing assembly 110 are each positioned above the flywheel assembly 102, and a second primary bearing assembly 108 and a second auxiliary bearing assembly 110 are each positioned below the flywheel assembly 102. It will be appreciated that the number of primary 108 and auxiliary 110 bearing assemblies may be varied and that two of each is merely exemplary of a particular preferred embodiment. It will additionally be appreciated that, although the depicted auxiliary bearing assemblies 110 are single bearing assemblies, one or both of the auxiliary bearing assemblies 110 could be duplex bearing assemblies.

Figure 3:
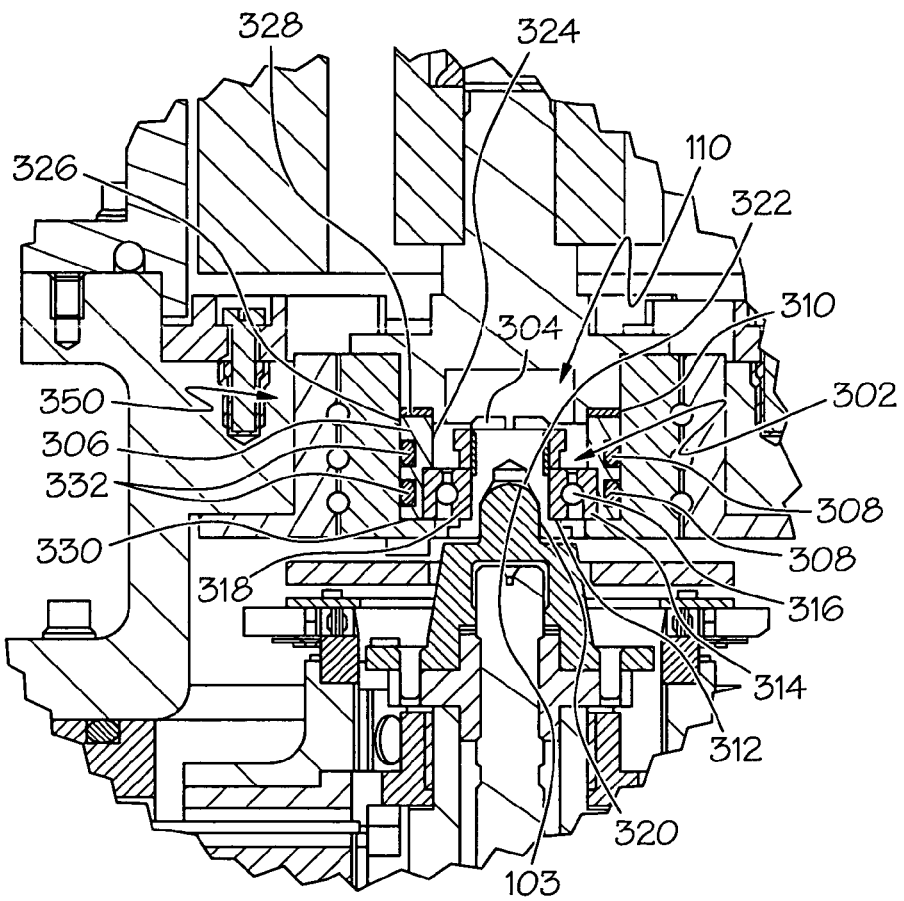
FIGS. 3 and 4 are close-up, partial cross section views of portions of the energy storage flywheel system of FIGS. 1 and 2.
Figure 4:
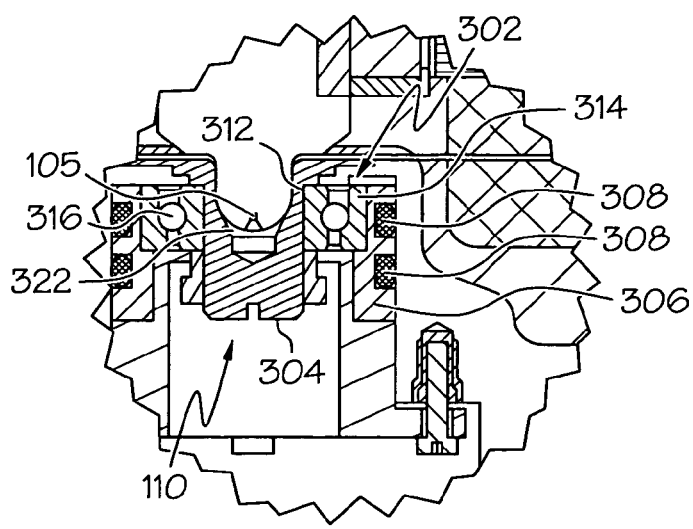

Turning now to FIGS. 3 and 4, close-up views of the auxiliary bearing assemblies 110 are shown, and will now be described in more detail. The auxiliary bearing assemblies 110 each include a bearing 302, a bearing mount 304, a sleeve 306, and a pair of resilient seals 308. The bearing 302 may be any one of numerous types of non-magnetic bearing assemblies. However, as was alluded to above, the bearing 302 is preferably a rolling element bearing, that includes an inner race 312, an outer race 314, and a plurality of spherical rolling elements 316 disposed between the inner 312 and outer 314 races. The inner 312 and outer 314 races, and the rolling elements 316 may be made of any one of numerous types of materials. In a preferred embodiment, however, each is made of a metallic material, such as AISI M50.

The bearing inner race 312 surrounds, and is coupled to, the bearing mount 304. The bearing mount 304 is configured as a so-called touchdown cup that includes an outer surface 318, and an inner surface 320 that defines a cavity 322. The bearing mount cavity 322 is dimensioned such that a small radial gap exists between the bearing mount inner surface 320 and the respective shaft assembly end sections 103, 105 when the primary bearing assemblies 108 are rotationally supporting the shaft assembly 104. The bearing mount cavity 322 is additionally dimensioned such that, upon relative translational movement between the shaft assembly end sections 103, 105 and the auxiliary bearing assemblies 110, the shaft assembly end sections 103, 105 contact the respective bearing mount inner surfaces 320. When this occurs, the auxiliary bearing assemblies 110 rotationally mount the shaft assembly 104. Preferably, the bearing mount inner surface 320 and the shaft assembly end sections 103, 105 are precision machined to minimize any radial play of one part relative to the other upon engagement, thereby minimizing radial movement of the auxiliary bearing assemblies during run down, following engagement.

The sleeve 306 surrounds the bearing 302 and includes an inner surface 324, an outer surface 326, a first end 328, and a second end 330. The sleeve inner surface 324 is coupled to the bearing outer race 314, and the sleeve outer surface 326 is coupled to a section of the housing assembly 112. In particular, at least in the depicted embodiment, the sleeve outer surface 326 for one of the first auxiliary bearing assembly 110 is coupled to the housing assembly 112 via an actuator assembly 350, whereas the sleeve 326 for the other auxiliary bearing assembly 110 is coupled directly to the housing assembly 112. It is noted that the actuator assembly 350, in response to commands received from an external control circuit (not shown), selectively moves the one auxiliary bearing assembly 110 into and out of contact with the shaft assembly first end section 103, which in turn selectively moves the shaft assembly second end section 105 into and out of contact with the other auxiliary bearing assembly 110. It is additionally noted that a detailed understanding of the structure of the actuator assembly 350 is not necessary to an understanding of the present invention and, therefore, will not be further described.

The outer surface 326 of each of the sleeves 306 preferably includes one or more grooves 332. In the depicted embodiment, the outer surfaces 326 are each provided with two grooves 332, though it will be appreciated that more or less than this number could be provided. The resilient seals 308 are disposed, one each, within each of the grooves 332. The resilient seals 308 damp out vibrations from the rotating group (e.g., the shaft assembly 104, flywheel assembly 102, and motor/generator 106) when the auxiliary bearing assemblies 110 are rotationally supporting the shaft assembly 104.

As FIG. 3 also shows, at least one of the auxiliary bearing assemblies 110 includes an axial preload spring 310. The axial preload spring 310 is coupled between the sleeve first end 328 and the housing assembly 112. In particular, the preload spring 310, at least in the depicted embodiment, is coupled between the sleeve first end 328 and the housing assembly 112 via a portion of the actuator assembly 350. The preload spring 310 may be any one of numerous types of springs including, but not limited to, a coil spring, a leaf spring, and a belleville washer. In the preferred embodiment, the preload spring 310 is a belleville washer.

No matter the particular type of preload spring 310 used, it absorbs any thermal growth differentials that may occur between the rotating group and the static structure of the flywheel system 100. Although the preload spring 310 is depicted as being disposed between the sleeve first end 328 and the housing assembly 112, it will be appreciated that it could additionally be disposed between the sleeve second end 330 and the housing assembly 112. Moreover, although only one of the auxiliary bearing assemblies 110 in the depicted embodiment includes a preload spring 310, it will be appreciated that either or both of the auxiliary bearing assemblies 110 could include a preload spring 310.

The auxiliary bearing assemblies 110 described herein are configured to absorb and/or damp out vibrations from rotating components following engagement of the auxiliary bearing assemblies 110. The auxiliary bearing assemblies 110 are additionally configured to absorb differential thermal growths between rotating and stationary components. These capabilities lead to increased useful life of the auxiliary bearing assemblies 110, as well as various other components within the system.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel system, comprising:
   a housing assembly;
   a shaft disposed within the housing assembly;
   a flywheel assembly mounted on the shaft;
   one or more primary bearing assemblies disposed within the housing assembly, each primary bearing assembly configured to selectively rotationally support the shaft;
   one or more auxiliary bearing assemblies disposed within the housing assembly, each auxiliary bearing assembly configured to selectively rotationally support the shaft and including:
      a bearing having at least an inner race and an outer race,
      a bearing mount coupled to the bearing inner race, the bearing mount disposed adjacent to the shaft, and configured to selectively engage and disengage the shaft,
      a sleeve having at least an inner surface, an outer surface, a first end, and a second end, at least a portion of the sleeve inner surface coupled to the bearing assembly outer race and at least a portion of the sleeve outer surface coupled to the housing assembly,
      one or more resilient seals coupled between the sleeve outer surface and the housing assembly, and one or more preload springs coupled between the housing assembly and one of the first and second sleeve ends; and an actuator assembly disposed within the housing assembly and configured, in response to commands supplied thereto, to selectively move the one or more auxiliary bearing assemblies into and out of contact with the shaft.

2. The system of claim 1, wherein each auxiliary bearing assembly comprises a rolling element bearing assembly having a plurality of spherical balls disposed between the inner and outer races.

3. The system of claim 1, wherein each bearing assembly mount comprises:

a touchdown cup having at least an outer surface and an inner surface that defines a cavity, the touchdown cup outer surface coupled to the bearing assembly inner race, the touchdown cup cavity surrounding at least a portion of the shaft and dimensioned, upon relative translational movement between the bearing assembly mount and the shaft, to selectively engage the shaft.

4. The system of claim 1, wherein:

the sleeve comprises one or more grooves formed in the outer surface thereof; and each resilient seal is disposed in at least one of the grooves.

5. The system of claim 1, wherein each resilient seal comprises an o-ring seal.

6. The system of claim 1, wherein each preload spring comprises one or more spring washers.

* * * * *